United States Patent [19]
Chang et al.

[11] Patent Number: 6,101,562
[45] Date of Patent: Aug. 8, 2000

[54] METHOD AND APPARATUS FOR INPUTTING AND RECOGNIZING CHARACTERS IN A PDA AND TRANSFERRING THE RECOGNIZED CHARACTERS IN PARALLEL TO A KEYBOARD BUFFER OF A PC

[75] Inventors: Jackson Chang; Dai-Shui Ho; Shih-Kuang Tsai, all of Taipei, Taiwan; Yi-Zhong Peng, Shanghai, China

[73] Assignee: Inventec Corporation, Taipei, Taiwan

[21] Appl. No.: 08/988,982

[22] Filed: Dec. 11, 1997

[30] Foreign Application Priority Data

Dec. 20, 1996 [TW] Taiwan ................................. 85115794

[51] Int. Cl.[7] ..................................................... G06F 13/00
[52] U.S. Cl. .............................. 710/73; 710/72; 709/200; 709/231
[58] Field of Search .................................. 710/72, 73, 52, 710/62; 709/200, 231, 227, 237; 395/892, 893, 200.01, 200.61, 872, 882, 200.57, 200.67

[56] References Cited

U.S. PATENT DOCUMENTS

| | | | |
|---|---|---|---|
| 5,179,375 | 1/1993 | Dick et al. ............................ | 340/825.51 |
| 5,260,697 | 11/1993 | Barrett et al. ............................ | 345/173 |
| 5,289,580 | 2/1994 | Latif et al. ................................ | 395/275 |
| 5,530,893 | 6/1996 | Sugi ........................................ | 395/825 |
| 5,564,055 | 10/1996 | Asnaashari et al. ..................... | 395/800 |
| 5,579,489 | 11/1996 | Dornier et al. .......................... | 395/281 |
| 5,600,800 | 2/1997 | Kikinis et al. ............................ | 395/281 |
| 5,664,231 | 9/1997 | Postman et al. ......................... | 395/893 |
| 5,787,455 | 7/1998 | Seybold ................................... | 711/100 |
| 5,797,002 | 8/1998 | Patterson, Jr. et al. .................. | 395/611 |
| 5,805,474 | 9/1998 | Danielson et al. ...................... | 364/708.1 |

*Primary Examiner*—Thomas C. Lee
*Assistant Examiner*—Tanh Quang Nguyen
*Attorney, Agent, or Firm*—McDermott, Will & Emery

[57] ABSTRACT

The present invention discloses an apparatus and a related method for achieving the purpose of improving the computer performance while inputting characters by using personal digital assistant (PDA) devices. The parallel port of the computer is connected with the PCMCIA (Personal Computer Memory Card International Association) card of the PDA device, and then a handshaking scheme is applied to establish a connection between the PC and the PDA device. After the connection has been successfully established, the input characters are transferred from the PDA device by parallel transformation without increasing the loading of the computer.

14 Claims, 7 Drawing Sheets

| D7~D5 | D4 | D3 | D2 | D1 | D0 |
|---|---|---|---|---|---|
| X | IRQ EN | SLCTIN | INIT | AUTOPDXT | STROBE |

FIG. 4A

| D7 | D6 | D5 | D4 | D3 | D2~D0 |
|---|---|---|---|---|---|
| BUSY | ACK | PE | SLCT | ERROR | X |

FIG.10

METHOD AND APPARATUS FOR INPUTTING AND RECOGNIZING CHARACTERS IN A PDA AND TRANSFERRING THE RECOGNIZED CHARACTERS IN PARALLEL TO A KEYBOARD BUFFER OF A PC

BACKGROUND OF THE INVENTION

1. Field of the Invention

The present invention relates to an apparatus and a related method for improving computer performance, and more particularly, to an apparatus and a method for improving the computer performance speed while the computer connects with personal digital assistant (PDA) devices for receiving characters.

2. Description of the Prior Art

PDA devices have become popular computer aided devices recently. For example, a useful hand-writing plate is used to receive characters from users, and the users can input characters without knowing their pronunciations. A personal computer (PC) connected with the hand-writing plate then displays the inputted characters after a recognition procedure.

Although the hand-writing plate gives a different way from keyboard to input characters, however, amount of memory is needed to store the relative information of the recognition procedure and the characters in the PC. Clearly, the performance speeds of other programs are significantly degraded. A requirement has been arisen to disclose an apparatus and a method, wherein the PC connected with PDA device for inputting characters can upgrade performance without changing current structure.

SUMMARY OF THE INVENTION

The principal object of the invention is to provide an apparatus and a method for improving the computer performance while the character recognition operations are performed.

The other object of the invention is to provide an apparatus and a method for transferring character information with a parallel scheme by applying the ready connections between the PC and the PDA devices.

According to the above-mentioned objects, the present invention discloses an apparatus for improving the PC performance without modifying the current PC structure. The parallel port of the PC is connected with the PCMCIA (Personal Computer Memory Card International Association) card of the PDA device, and then a handshaking scheme is applied to establish a connection between the PC and the PDA device. Characters can be inputted and recognized in the PDA device instead in the PC as to save processing time of the PC. The inputted characters are proper converted and then send to keyboard buffer after the characters arrive at the parallel port of the PC. The PC treats those characters from the PDA device as from the keyboard, and displays them on PC screen later for editing or storing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
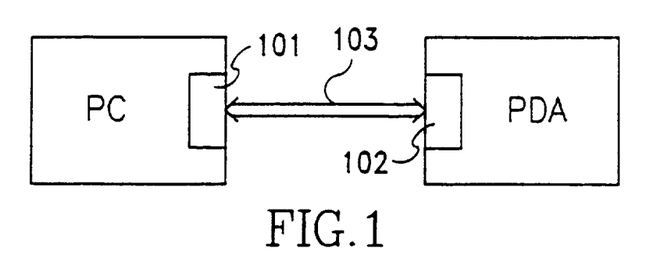
FIG. 1 is a functional diagram representative of a connection between a PC and a PDA device in the embodiment of the invention.

FIG. 1 describes the connection diagram between a PC and a PDA device, wherein a PC parallel port 101 is connected with the PCMCIA card 102 of the PDA device by using a conventional cable 103.

Figure 4A:
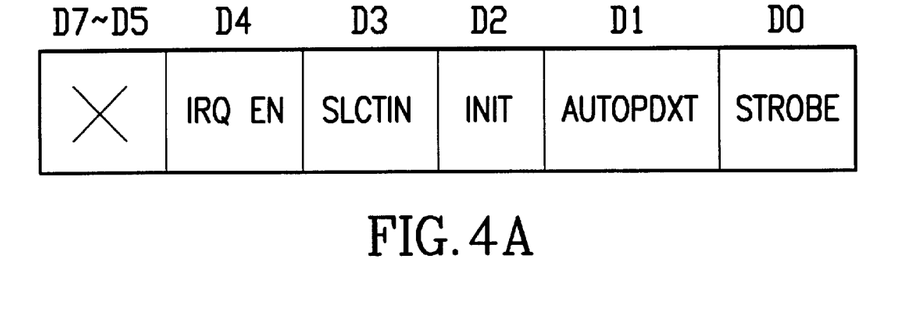
FIG. 4A displays the content of the control signals applied in the embodiment.

FIG. 4A represents the contents of a control signal used in the embodiment, wherein each of the control signal contains eight bits. Clearly, each bit relates a specific control except the D5 bit to the D7 bit that are used as ignored bits. The D0 (STROBE) bit of the control signal is used as a data strobe flag indicating when to strobe data from the connection. The D1 (AUTOPDXT) bit is an auto returning flag for indicating a return key has been pressed. The D2 (INIT) bit is an initializing flag representing whether the PC parallel port (LPT port) needs to be initialized or not. The D3 (SLCTIN) bit is applied as an indication of which PC parallel port is connected with the PDA device. The D4 (IRQ EN) bit is a flag for controlling whether an interrupt is acceptable when establishing the connection.

Figure 4B:
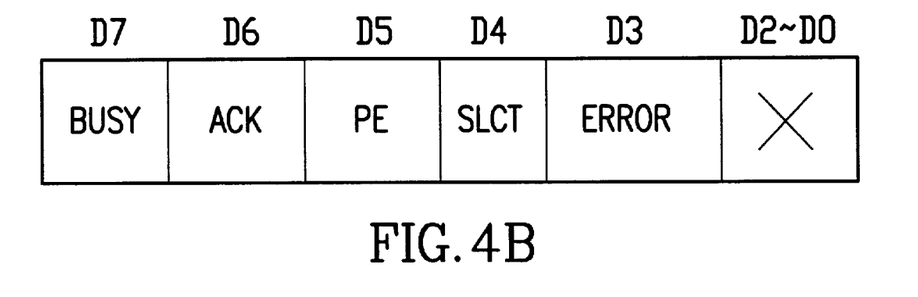
FIG. 4B displays the content of the state signals applied in the embodiment.

FIG. 4B describes the contents of a state signal used in the embodiment, wherein each of the control signal also contains eight bits. Except the D0 bit to the D2 bit that are used as ignored bits, each bit also relates a specific state control. The D3 (ERROR) bit of the state signal is set when error occurs in connection. The D4 (SLCT) bit is used to indicate which LPT port are connected with the PDA device. The D5 (PE) bit indicates the response of the LPT port when LPT port receives data from the PDA device. The D6 (ACK) bit is a flag used as acknowledgment indication. The D7 bit (BUSY) is a flag indicating whether the PDA device has sent data to the LPT port.

Figure 2:
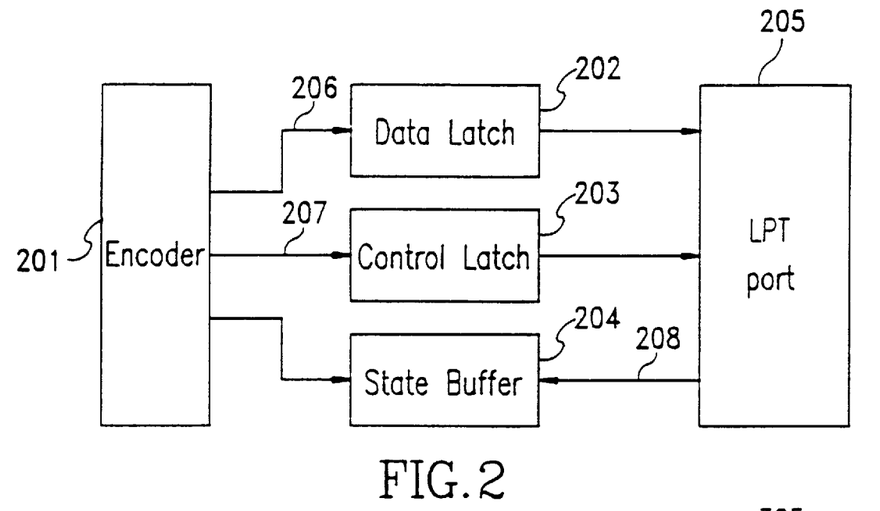
FIG. 2 illustrates a detail block diagram for representing the connection in the PC parallel port.

FIG. 2 represents a detail diagram illustrative of the LPT port while the PC and the PDA device are connected. In the embodiment, a CODEC (Coder-DECoder) 201 encodes data that will be transferred from the PC to the PDA device. A data latch 202 and a control latch 203 respectively lock data signal 206 and control signal 207 that come from the CODEC 201, and then output them to the PDA device through a LPT port 205. A state buffer 204 receives state signal 208 from the PDA device to judge the current state of the PDA device. The LPT port 205 can be any PC parallel port such as LPT1 or LPT2.

Figure 3:
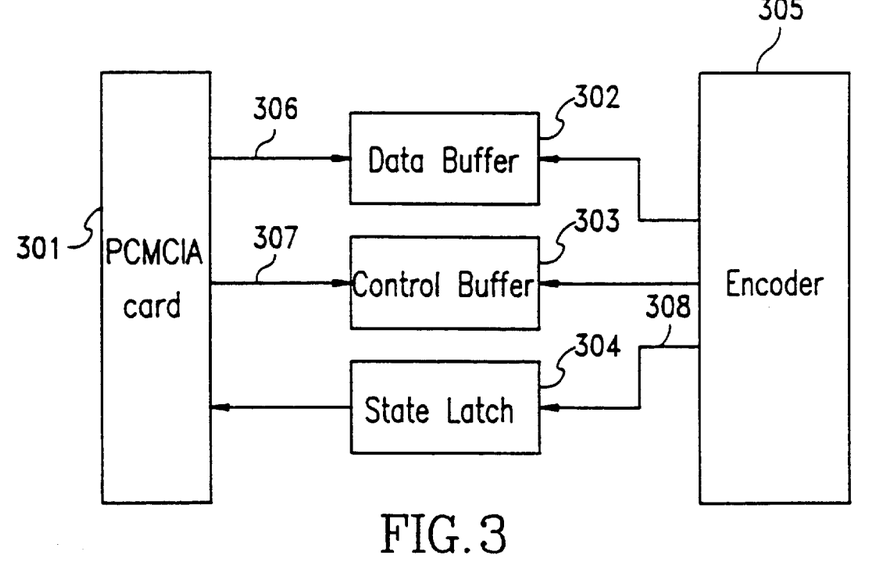
FIG. 3 illustrates a detail block diagram representative of the connection in the PCMCIA card of the PDA device.

FIG. 3 describes a detail diagram of the PCMCIA card 301 while the PDA device and the PC are coupled. In the embodiment, the PCMCIA card 301 respectively stores the data signal 306 and the control signal 307 into a data buffer 302 and a control buffer 303 when they are transferred from the PC. Both the data signal 306 and the control signal 307 are sent to the PDA device as to control the operations of the PDA device. A state latch 304 receives state signal 308 from a CODEC 305, and outputs to the PC later for notifying current state to the PC. The CODEC 305 is used to decode the data signal 306 and the control signal 307 after receiving, and used to encode the state signal 308 before outputting. In addition, the control signal and the state signal represented in the FIG. 2 and the FIG. 3 follow the definitions of the FIG. 4A and 4B.

Figure 5:
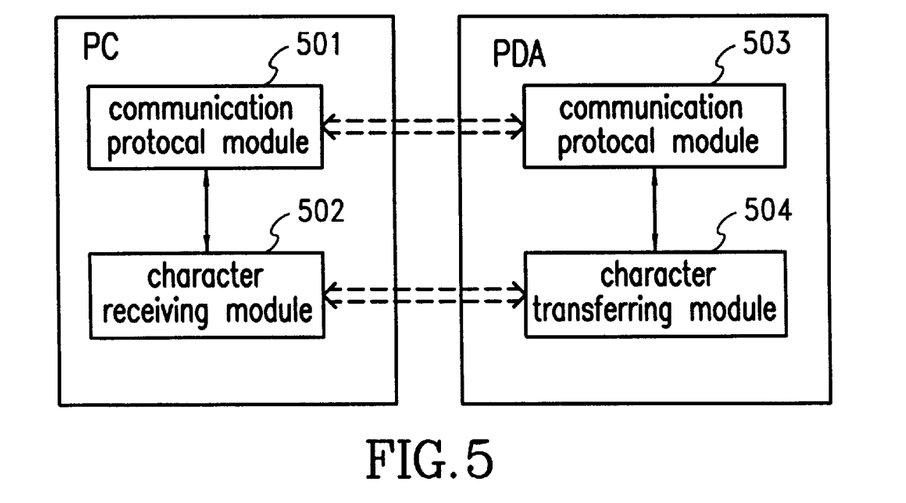
FIG. 5 represents a structure diagram illustrative of the software modules connections in the embodiment.

Software modules for driving the operations of the hardware components are described in FIG. 5. A communication protocol module 501 and a character receiving module 502 must be loaded in the PC, and another communication protocol module 503 and a character transferring module 504 must be run on the PDA device. When a character is going to transfer, this character is first divided into pieces of packages in the communication protocol module 503, and these packages are then transferred to the PC through the character transferring module 504. The PC receives these packages by using the character receiving module 501, and then encapsulates them to extract character information in the communication protocol module 501.

Figure 6:
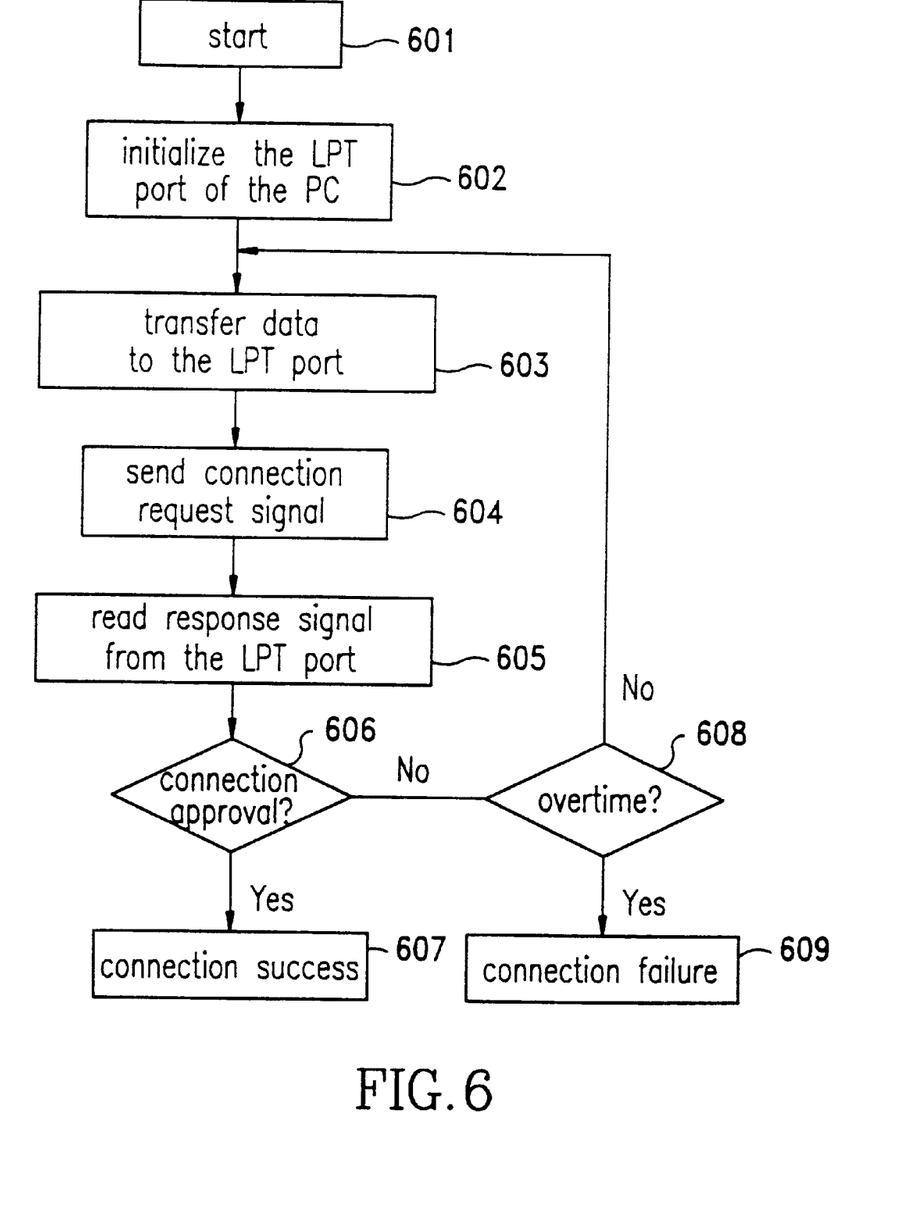
FIG. 6 represents a flow chart for describing the hand-shaking operations of the PC.

FIG. 6 shows a flow chart representative of the hand-shaking operations in the PC. When the hand-shaking operations start (step 601), the PC will initialize the buffer of the LPT port connected with the PDA device (step 602). Next, control signal and testing data are ready in the LPT port for transferring to the PDA device later (step 603). In accompanied with the control signal and testing data, a connection request signal is sent to the PDA device for notifying that the PC want a connection (step 604). PC then read response signal from the buffer of the LPT port as to realize the current state of the PDA device (step 605). From the response signal, the PC knows whether the connection has been successfully established or not (step 606). If the connection is established successfully, a communication starts for transferring character information between the PC and the PDA device (step 607). If the connection fails and connection time is out, it indicates the connection has failed this time (step 608 and 609). There maybe some problems appear in hardware components, such as cable loose or bad components or else. Otherwise, the PC will transfer the data signal and the control signal for retrying to connect with the PDA device again (returns to step 603). Please note that the testing data are fixed numerical numbers known for the PC and the PDA device as to check whether transformations in connection are correct or not.

Figure 7:
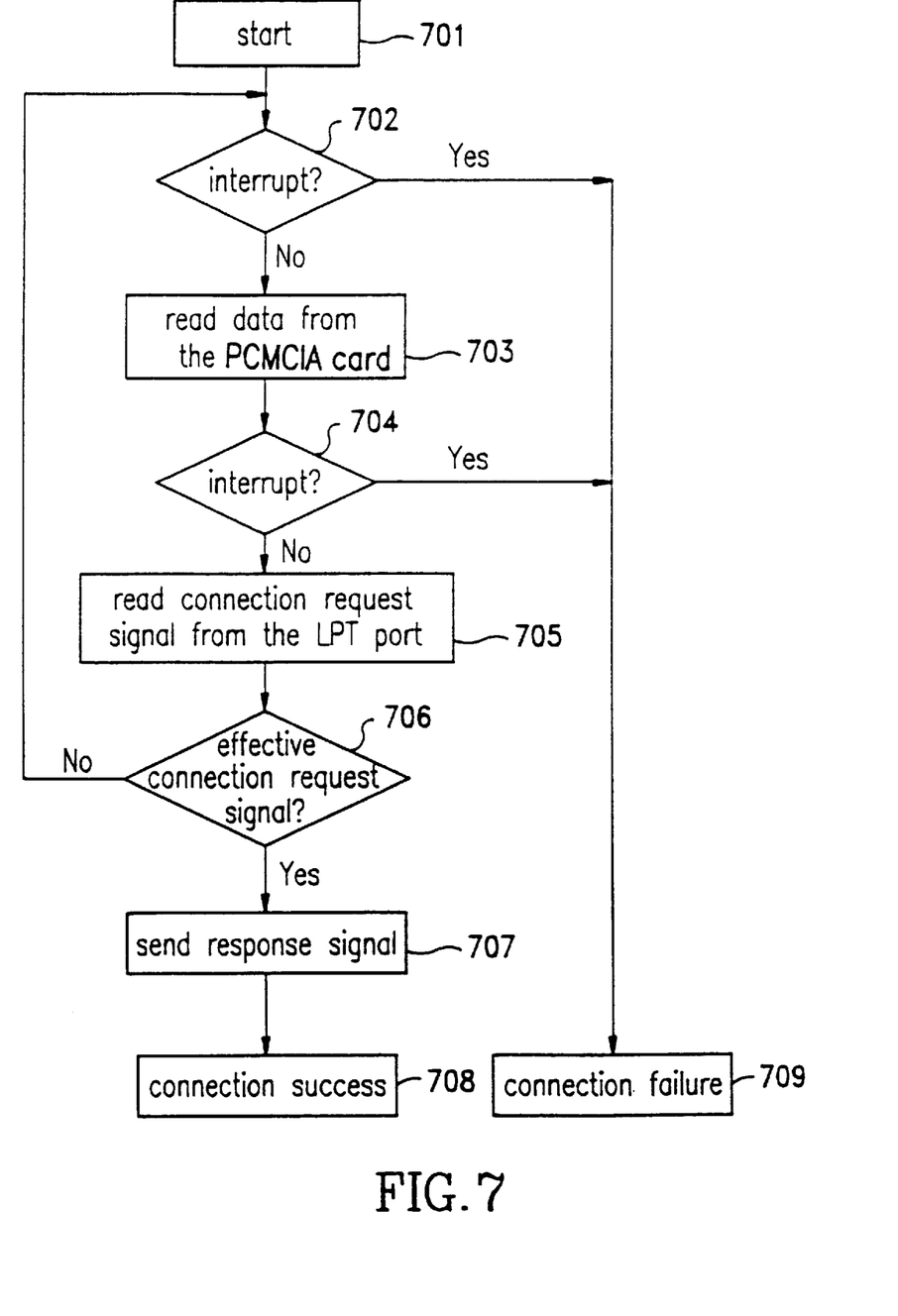
FIG. 7 represents a flow chart for describing the hand-shaking operations of the PDA device.

In contrast to the hand-shaking operations of the PC, the PDA device also follows a specific procedure to response the request. FIG. 7 describes a flow chart representative of the PDA device response procedure. When the PDA device receives the connection request signal (step 701), the PDA device will check whether a user gives an interrupt (step 702). If no interrupt is detected, then the PDA device reads the testing data and the control signal from the PCMCIA card (step 703). Further, the user also can interrupt the connection to be continuing (step 704). When the testing data and the control signal are read, the PDA device reads the connection request signal and detects its correction (step 706). If the connection request signal is effective then the PDA device will give a response signal to the PC (step 707).

It also indicates that the connection has been successfully established (step 708). The user can interrupt the above procedure when it is running, which will terminate the connection procedure (step 709). Of course, the D4 bit (IRQ EN) of the control signal can be set to prohibit user's interrupts.

Figure 8:
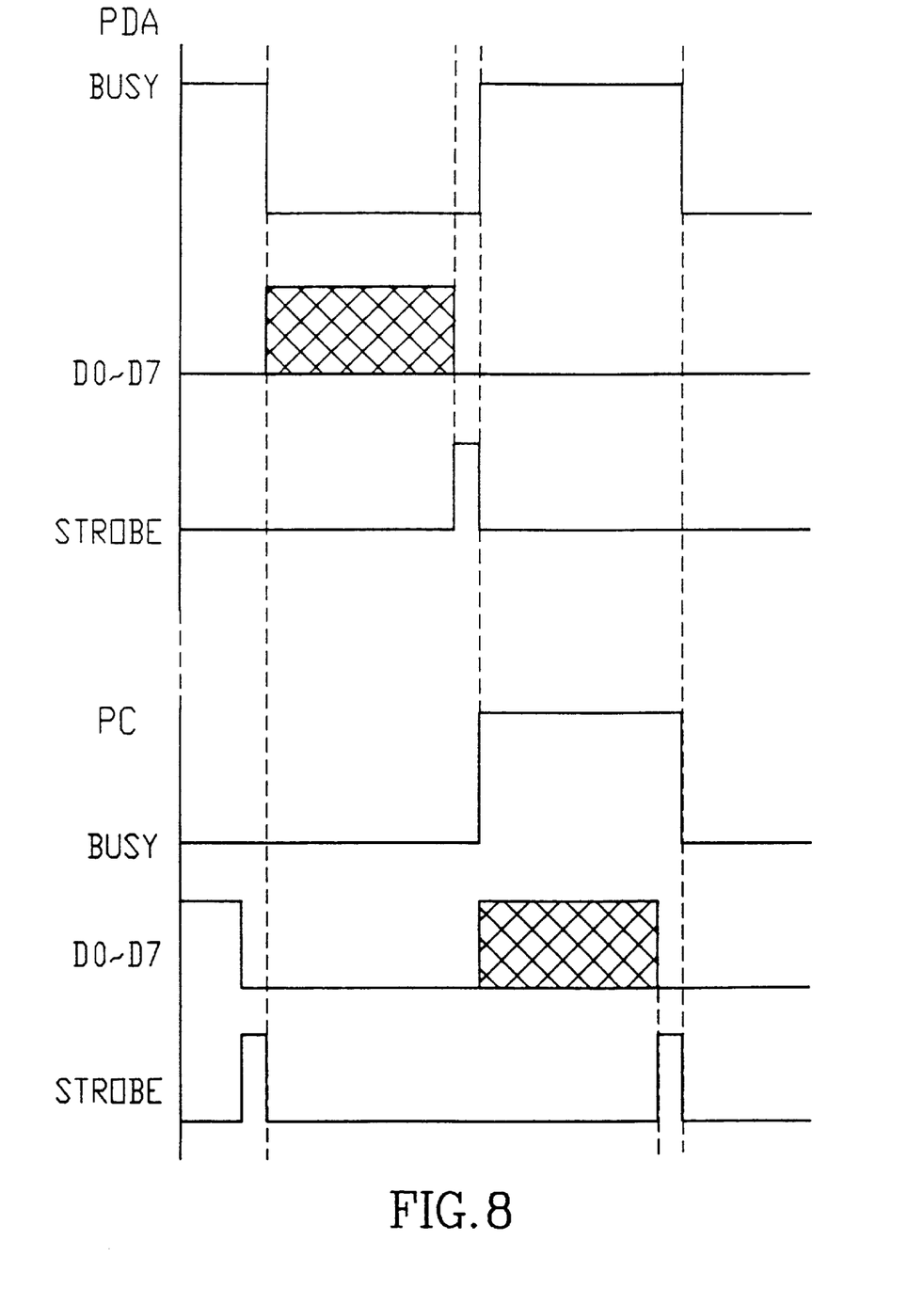
FIG. 8 is a timing diagram representative of the time relations when the hand-shaking operations is executing.

FIG. 8 gives a timing diagram for representing the hand-shaking operations between the PC and the PDA device as a further explanation. When the PC requests a connection with the PDA device, the PC sends a STROBE signal to clear the BUSY bit (to be low voltage). The connection control information (such as the testing data, the control signal, the connection request signal, and the response signal) is put in the D0~D7 and waits for transferring. When the connection control information is stable, the PDA device sets the STROBE bit (to be high voltage) as to notify the PC to read the connection control information. After the PC reading the connection control information, the PC sets the STROBE bit (to clear the BUSY) for requesting another transformation about the connection control information.

Figure 9:
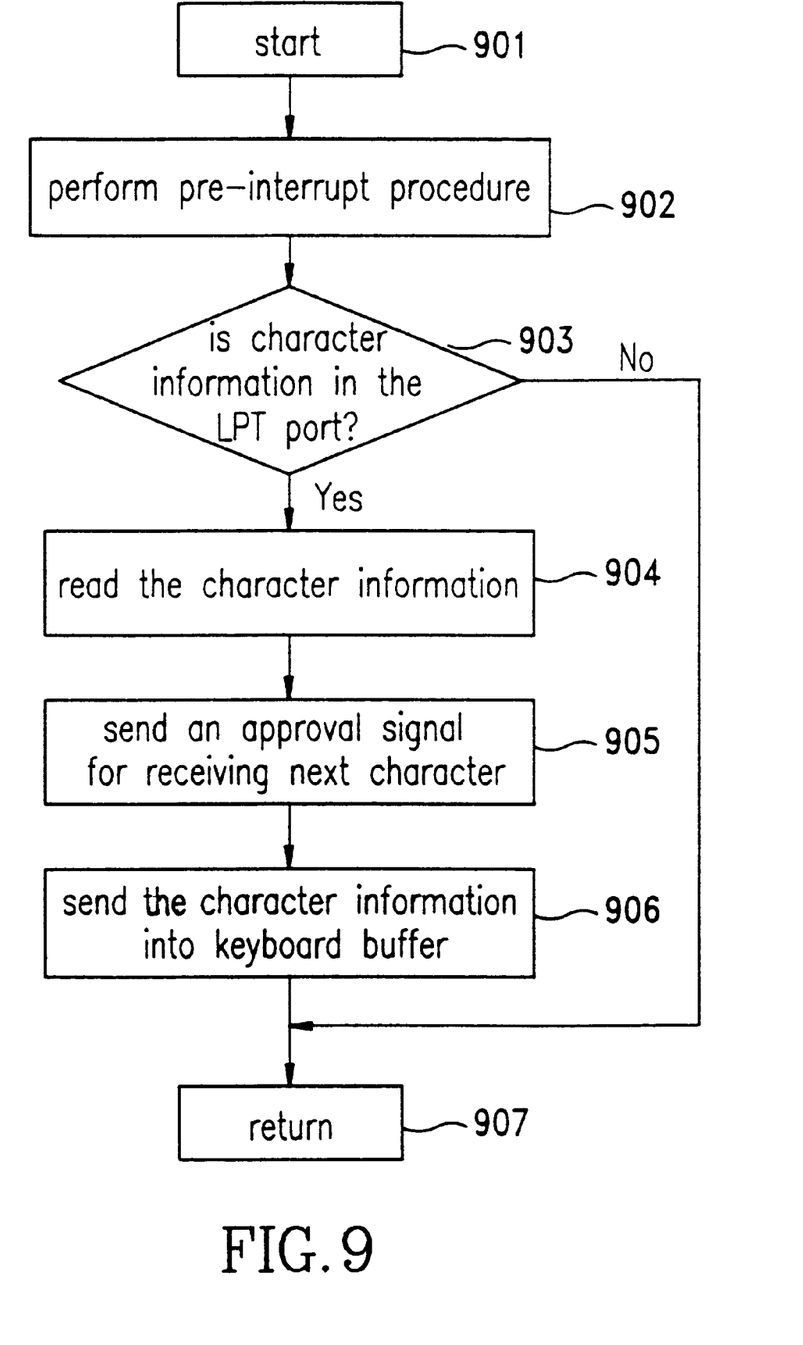
FIG. 9 describes a flow chart representative of the operations of receiving a character in the PC parallel port.
Figure 10:
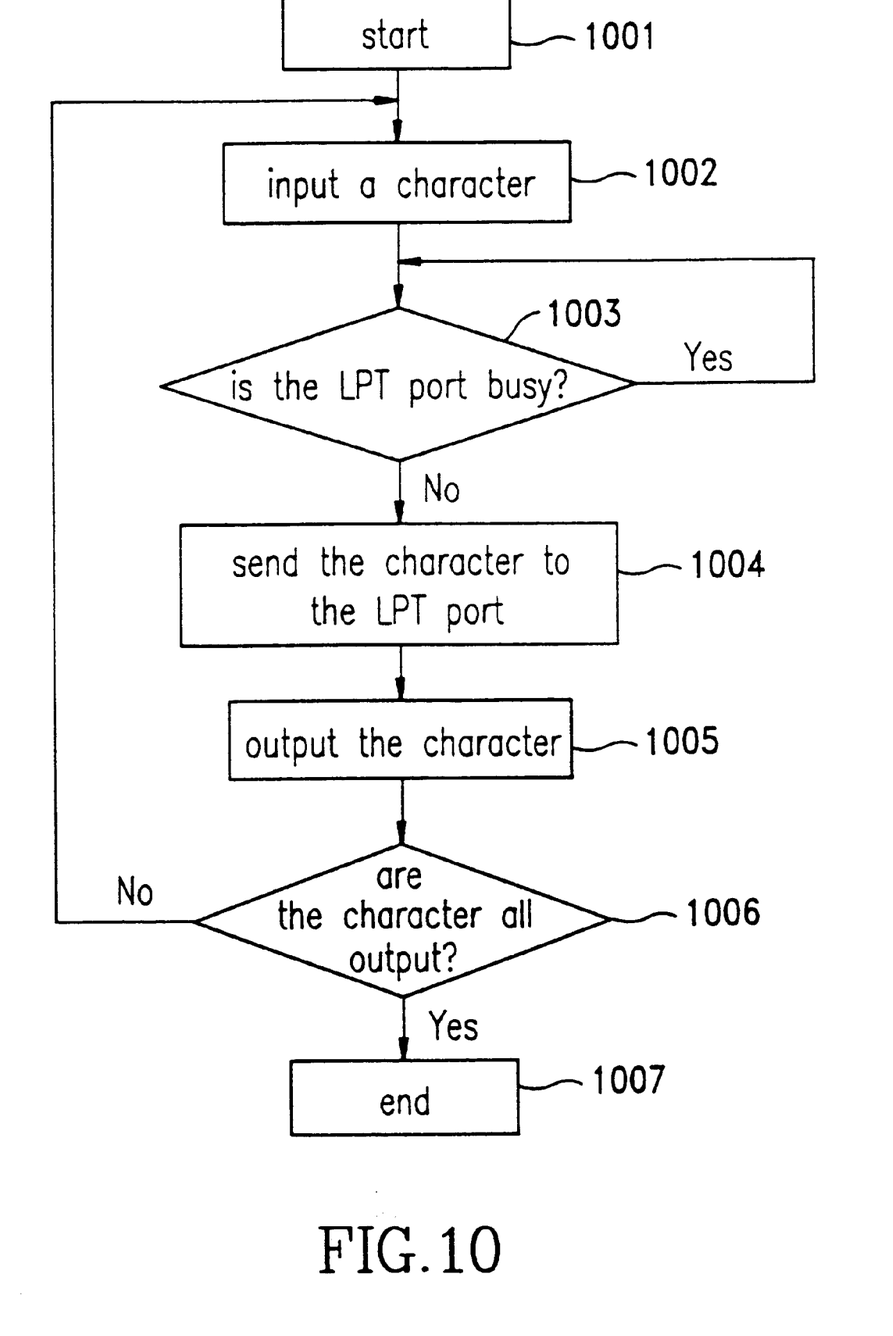
FIG. 10 illustrates a flow chart illustrative of the operations of transferring a character from the PDA device to the PC.

Character information can be transferred when the connection between the PDA device and the PC is successfully established. FIG. 9 and FIG. 10 respectively describe the transformation operations at the PC and PDA device.

FIG. 9 represents the transformation operations in the PC. When the PC wants to detect whether character information transferred from the PDA device (step 901), the PC must perform a pre-interrupt procedure, such as performing a keyboard interrupt service procedure, at first (step 902). A procedure for detecting the presence of the character information in the LPT port is sequentially performed (step 903). If no character information is detected, the PC returns to the job before performing the detecting procedure (step 907). If there is character information in the LPT port, the PC will read it out (step 904) and then send an approval signal for receiving next character (step 905). All the character information is proper converted into a keyboard readable style and then sent to the keyboard buffer for displaying later (step 906). The character transferred from the PDA device also can be edited and modified as input from the keyboard.

FIG. 10 represents the transformation operations in the PDA device. When the PDA device sends character information to the PC (step 1001 and 1002), the PDA device will detect whether the LPT port is busy or not (step 1003). If the LPT port is busy then the PDA device keeps waiting until the LPT receives the character information (step 1004). The character information is then output to the PC later (step 1005). Next, the PDA device needs to check whether all character information has been transferred (step 1006). If there is further character information needs to be transferred, the PDA device will repeats the step 1002 through 1006 as to output the character information to the PC (step 1007). Please note that characters inputted from the user should pass a recognition procedure to eliminate illegal syntactic combinations, wherein the recognition procedure is conventionally performed in the PC. Therefore, the PC performance can be significantly upgraded.

In addition, not only need to connect the PCMCIA card of the PDA device and the PC LPT port, but also the software modules described in the FIG. 5 have to be installed both in the PDA device and the PC. The performance speed of the PC will not be affected when user input a character from the PDA device because the character recognition procedure is performed in the PDA device but in the PC. Furthermore, the character information output from the PDA device is independent with PC applications. The PC applications do not know where the inputted character is from (keyboard or elsewhere) because the character information is sent to the keyboard buffer. Obviously, the application efficiency of the present invention is significantly upgraded.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus for inputting characters without degrading computer performance, wherein said apparatus comprises:

input aided means for inputting characters, wherein said characters are recognized before outputting; and processing means for receiving said recognized characters by transfer of data in parallel from said input aided means and displaying said recognized characters, said processing means generating control signals to control said transfer of data in parallel, said processing means comprising inputting and outputting parallel means for parallel receiving said recognized characters converting means for converting a style of said recognized characters and storing said converted characters into a keyboard buffer, and displaying means for displaying said converted characters stored in said keyboard buffer.

2. The apparatus according to the claim 1, wherein said input aided means comprises:

input means for inputting said characters;

character recognition means for recognizing said characters; and parallel transformation means for parallel transferring said recognized characters to said processing means.

3. The apparatus according to the claim 2, wherein said parallel transformation means comprises:

control signal latching means for receiving said control signals from said processing means;

state signal buffering means for inputting state signals from said input aided means, wherein said state signals indicate a current state of said input aided means; and inputting and outputting means for receiving said state signals from said state signal buffering means, and then outputting said state signals to said processing means, and for receiving said control signals from said processing means, and then outputting said control signals to said control signal latching means.

4. The apparatus according to the claim 1, wherein said inputting and outputting parallel means comprises:

control signal latching means for receiving control signals from said processing means;

state signal buffering means for receiving state signals from said input aided means, and then outputting said state signals to said processing means; and buffering aided means for receiving said state signals from said input aided means, and then outputting said state signals to said state signals buffering means, and for receiving said control signals from said control signal latching means, and then outputting said control signals to said input aided means.

5. The apparatus according to claim 1, wherein said input aided means comprises a personal digital assistant device.

6. The apparatus according to claim 1, wherein a connection between said input aided means and said processing means is established by following a hand-shaking scheme.

7. An apparatus for inputting characters without degrading computer performance, wherein said apparatus comprises:

input aided means for inputting characters, wherein said characters are recognized before outputting; and processing means for receiving said recognized characters by transfer of data in parallel from said input aided means, said processing means displays said recognized characters after converting a style of said recognized characters, said processing means generating control signals to control said transfer of data in parallel, said processing means comprising inputting and outputting parallel means for parallel receiving said recognized characters, converting means for converting a style of said recognized characters and storing said converted characters into a keyboard buffer, and displaying means for displaying said converted characters stored in said keyboard buffer;

a connection between said input aided means and said processing means is established by following a hand-shaking scheme.

8. The apparatus according to the claim 7, wherein said input aided means comprises:

input means for inputting said characters;

character recognition means for recognizing said characters; and parallel transformation means for parallel transferring said recognized characters to said processing means.

9. The apparatus according to the claim 8, wherein said parallel transformation means comprises:

control signal latching means for receiving said control signals from said processing means;

state signal buffering means for inputting state signals from said input aided means, wherein said state signals indicates a current state of said input aided means; and inputting and outputting means for receiving said state signals from said state signal buffering means, and then outputting said state signals to said processing means, and for receiving said control signals from said processing means, and then outputting said control signals to said control signal latching means.

10. The apparatus according to the claim 7, wherein said inputting and outputting parallel means comprises:

control signal latching means for receiving control signals from said processing means;

state signal buffering means for receiving state signals from said input aided means, and then outputting said state signals to said processing means; and buffering aided means for receiving said state signals from said input aided means, and then outputting said state signals to said state signals buffering means, and for receiving said control signals from said control signal latching means, and then outputting said control signals to said input aided means.

11. The apparatus according to claim 7, wherein said input aided means comprises a personal digital assistant device.

12. A method for inputting characters without degrading computer performance, said method comprising the steps of:

applying a hand-shaking scheme to establish a connection between a computer and a personal digital assistant device;

inputting characters into said personal digital assistant device;

recognizing said characters by said personal digital assistant device;

outputting said recognized characters to said computer through said connection;

storing said recognized characters in a keyboard buffer; and displaying said recognized characters stored in said keyboard buffer.

13. The method according to claim 12, wherein said step of outputting said recognized characters through said connection follows a transfer of data in parallel scheme.

14. The method according to claim 12, wherein said step of storing said recognized characters in said keyboard buffer comprises a step of converting a style of said recognized characters to be a keyboard readable style.

* * * * *